(12) United States Patent
Montanana

(10) Patent No.: US 7,051,855 B2
(45) Date of Patent: May 30, 2006

(54) POSITIVE ENGAGEMENT CLUTCH

(75) Inventor: Raul Montanana, Lydbrook (GB)

(73) Assignee: SAMAR Systems Limited, Coleford (GB)

( * ) Notice: Subject to any disclaimer, the term of this patent is extended or adjusted under 35 U.S.C. 154(b) by 8 days.

(21) Appl. No.: 10/776,218

(22) Filed: Feb. 12, 2004

(65) Prior Publication Data
US 2004/0182671 A1 Sep. 23, 2004

(30) Foreign Application Priority Data
Feb. 12, 2003 (GB) ................. 0303128.3

(51) Int. Cl.
F16D 11/12 (2006.01)
(52) U.S. Cl. .................. 192/48.5; 192/69.5
(58) Field of Classification Search .......... 192/69, 192/69.5, 12.5, 17 R, 19, 48.1, 48.3, 48.5, 192/49, 95, 12 R
See application file for complete search history.

(56) References Cited

U.S. PATENT DOCUMENTS

| | | |
|---|---|---|
| 3,066,777 A | 12/1962 | Hoffman |
| 3,688,885 A * | 9/1972 | Cummings ............ 192/95 |
| 4,022,309 A * | 5/1977 | Denkowski et al. ...... 192/48.5 |
| 5,658,087 A * | 8/1997 | Butkovich et al. ...... 403/359.5 |

FOREIGN PATENT DOCUMENTS

| | | |
|---|---|---|
| DE | 1 057 885 | 2/1959 |
| FR | 514 290 | 3/1921 |
| FR | 1 150 579 | 1/1958 |
| GB | 2 068 061 | 8/1981 |
| GB | 2 131 502 | 6/1984 |
| NL | 6 609 188 | 1/1967 |

* cited by examiner

Primary Examiner—Saul Rodriguez
(74) Attorney, Agent, or Firm—Young & Thompson

(57) ABSTRACT

A positive engagement clutch has a torque input side and a torque output side. The clutch comprises a torque input member arranged on the torque input side, a torque output member arranged on the torque output side, first engagement members, second engagement members, and an actuator. The torque input member and the torque output member are arranged concentrically to rotate on a common axis. One of the torque input member and the torque output member carries the first engagement members, and the other of the torque input member and the torque output member carries the second engagement members. The first engagement members are radially movable by the actuator between a projecting and a retracted position, and the second engagement members project radially into a gap between the torque input member and the torque output member.

7 Claims, 5 Drawing Sheets

POSITIVE ENGAGEMENT CLUTCH

This invention relates to a positive engagement clutch particularly, but not exclusively, for use with a rotary coupling.

BACKGROUND OF THE INVENTION

Rotary couplings are known, such as from GB 2343923 which utilises coupling members carried by a driving part and seated in recesses on a driven part. A driving torque can thus be transmitted from the driving part to the driven part through the coupling members, but the application of a reverse torque, i.e. where a torque is applied externally to the driven part of the coupling causing the driven part to attempt to drive the driving part, such as in a runaway condition, causes the coupling members to move or tilt relative to their recesses, thereby engaging a fixed braking surface on the rotary coupling and locking it up.

However, there are times when it is necessary to be able to allow transmission of a reverse torque. For example, it is a requirement that motorised wheel-chairs be capable of having a free-wheel state, i.e. where the application of a reverse torque is permitted without locking the rotary coupling, as well as a motor-driven state. Obviously, use of the above-mentioned known rotary coupling prevents the wheel-chair ever assuming a dangerous runaway condition, but also fails to provide for the required free-wheel state.

A further problem is apparent in battery operated drive systems, for example in stairlifts, where it is a requirement to have a battery-operated emergency back-up system, in electric vehicles, such as golf carts, and in gravity-assisted doors, such as fire-doors. These drive systems commonly utilise worm-drive gearbox arrangements due to their inherent ability to prevent or inhibit the transmission of reverse torque (i.e. back-driving). However, it is well-known that worm-drive gearbox arrangements are extremely inefficient, generally in the order of 70%. As a consequence, bigger or more battery packs are required to enable longer running times, which itself leads to increased weight and reduced space problems.

It is known that reduction-type gearbox arrangements are far more efficient than worm-drive gearbox arrangements. However, reduction gearbox arrangements have a much reduced ability to inhibit back-driving, and are thus generally not preferred.

Yet another problem is apparent in clutch arrangements. Friction-plate clutch arrangements are in common-use, but the plates tend to wear causing unreliable torque transmission, and the magnitude of torque which can be transmitted before breakage is limited. Furthermore, feedback to an operator through a friction clutch is, at best, limited. Generally, the only feedback an operator will notice when using a friction clutch is if the clutch is slipping.

The present invention seeks to overcome these problems.

SUMMARY OF THE INVENTION

According to a first aspect of the present-invention, there is provided a positive engagement clutch having a torque input side and a torque output side, the clutch comprising a torque input member arranged on the torque input side, a torque output member arranged on the torque output side, first engagement members, second engagement members, and an actuator, the torque input member and the torque output member being arranged concentrically to rotate on a common axis, one of the torque input member and the torque output member carrying the first engagement members, and the other of the torque input member and the torque output member carrying the second engagement members, the first engagement members being radially movable by the actuator between a projecting and a retracted position, and the second engagement members projecting radially into a gap between the torque input member and the torque output member, the first and second engagement members engaging with each other, when the first engagement members are in the projecting position, to progressively engage the torque input and output members to allow the transmission of torque to the torque output side, and the first and second engagement members being disengaged from each other, when the first engagement members are in the retracted position, to prevent the transmission of torque to the torque output side.

According to a second aspect of the present invention, there is provided a positive engagement clutch in accordance with the first aspect of the invention, in combination with a rotary coupling, the rotary coupling comprising a driving part, a drivable part, a fixed part in which the driving and drivable parts are each rotatable coaxially, and a set of coupling members carried by one of the driving and drivable parts for torque-transmitting engagement with the other, the coupling members being selectively positionable so that, in a first condition, the coupling members are juxtaposed to a primary annular contact surface of either the fixed part or the drivable part and, in a second condition, the coupling members are juxtaposed to a secondary annular contact surface of the driving part, each coupling member being free to move relative to the driving and drivable parts into and out of engagement with the primary and secondary annular contact surfaces, the arrangement being such that, when the coupling members are in the first condition, the application of a first torque on the coupling members causes the coupling members to engage the primary annular contact surface and, when the coupling members are in the second condition, the application of a second torque on the coupling members causes the coupling members to engage the secondary annular contact surface.

The present invention will now be described, by way of example, with reference to the accompanying drawings.

DETAILED DESCRIPTION OF THE PREFERRED EMBODIMENTS

Figure 1:
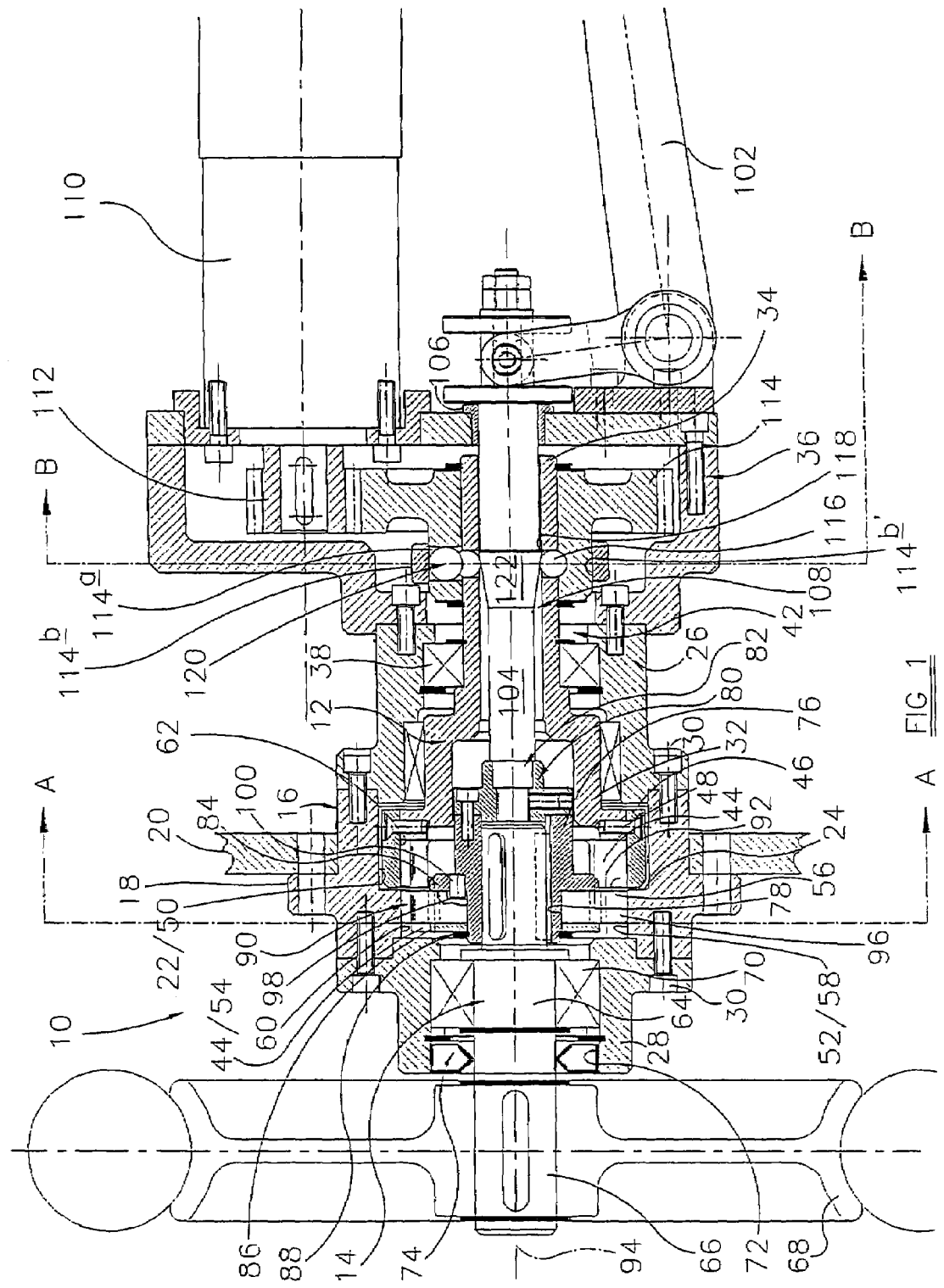
FIG. 1 is a partial longitudinal cross-section of one embodiment of a rotary coupling incorporating a positive engagement clutch in accordance with the first and second aspects of the present invention, both in a first condition.

Referring to the drawings, there is shown a rotary coupling 10 adapted for use as part of a wheel-chair. The rotary coupling 10 comprises a driving part 12, a drivable part 14 and a fixed part 16. The driving part 12 and the drivable part 14 are mounted to be rotatable coaxially within the fixed part 16. The fixed part 16 is a body having an external fastening flange 18 for attachment to a suitable chassis 20 and a stepped cylindrical bore 22 forming an interior shoulder 24. One end of the body is closed by a first end housing 26, and the other by a second end housing 28. The body of the fixed part 16 and its two end housings 26 and 28 are secured together by suitable fastening means, such as screw-threaded fasteners 30.

The driving part 12 of the coupling 10 comprises a hollow stepped driving shaft 32, or input shaft, having a projecting portion 34 which projects from the first end housing 26, coaxially with the fixed part body, and which is torque disengagably coupled to a reduction gearbox 36. The first end housing 26 includes bearings 38 positioned in spaced relationship, and typically a gasket (not shown) situated adjacent the opening 42 of the first end housing 26. The driving shaft 32 is directly supported by the bearings 38 and projects through the gasket, which provides a fluid-tight seal around the outer circumference of the driving shaft 32.

The driving part 12 is completed by a planet carrier 44, which projects from the end of the driving shaft 32 opposite the projecting portion 34, and an annular contact member 46 which is in the form of a coaxial ring concentrically arranged with and around the planet carrier 44 and fastened to the driving shaft 32 using screw-threaded fasteners 48. The planet carrier 44 projects axially beyond the annular contact member 46, for reasons which will become apparent hereinafter. The annular contact member 46 is positioned in the larger diameter portion 50 of the stepped bore 22, directly adjacent to the interior shoulder 24 of the fixed part 16, and has an interior diameter equal, or substantially equal, to the smaller diameter portion 52 of the stepped bore 22 of the fixed part 16.

The planet carrier 44 takes the form of an integral annular ring which is coaxial with the driving shaft 32 and which is interrupted by a number of axially elongate U-shaped (when viewed in plan) seatings 54, each having two generally opposed arcuate thrust surfaces 56. The outer perimeter of the planet carrier 44 lies radially inside the annular contact member 46 of the driving part 12 and the smaller diameter portion 52 of the axial stepped bore 22 of the body of the fixed part 16. The interior surface 58 of the smaller diameter portion 52 of the fixed part 16 constitutes a primary annular contact surface, or braking surface 60, and the interior surface 58 of the annular contact member 46 constitutes a secondary annular contact surface 62. The U-shaped seatings 54 are sufficiently elongate to lie in transverse planes containing the primary braking surface 60 of the fixed part 16 and the secondary annular contact surface 62 of the driving part 12.

The drivable part 14 comprises a drivable shaft 64, or output shaft, having a projecting portion 66 on which a ground engaging wheel 68 is received, the wheel 68 being angularly fixed relative to the drivable shaft 64. The drivable shaft 64 extends through the second end housing 28 and coaxially with the cylindrical body of the fixed part 16 and the driving shaft 32 of the driving part 12. The second end housing 28, similarly to the first end housing 26, includes a bearing 70 and a gasket 72 situated adjacent the opening 74 of the second end housing 28. The drivable shaft 64 is directly supported by the bearing 70 and projects through the gasket 72, which provides a fluid-tight seal around the circumference of the drivable shaft 64.

Figure 3:
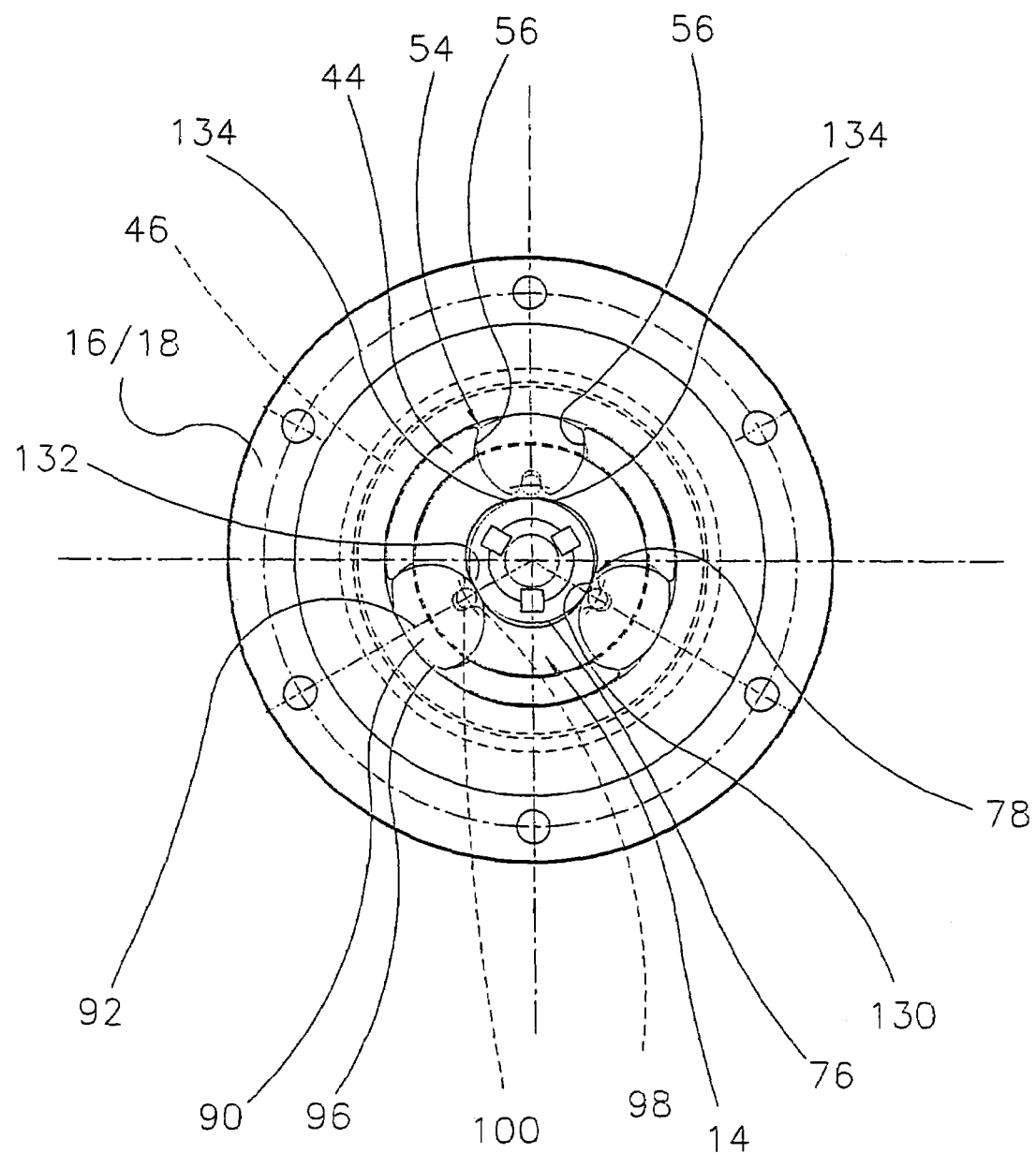
FIG. 3 is a transverse sectional view taken along the line A—A in FIG. 1.

The drivable part 14 further comprises a collar 76 which is coaxially aligned with the driving and drivable shafts 32 and 64 and which is keyed to the end of the drivable shaft 64 positioned within the fixed part 16. The planet carrier 44 surrounds the collar 76, and the collar 76 includes shallow curved, or concave, recesses 78 which are open towards the corresponding U-shaped seatings 54 of the planet carrier 44. As best seen in FIG. 3, the concave recesses 78, when viewed in transverse cross-section, have a part-sinusoidal shape.

The keying of the collar 76 to the drivable shaft 64 prevents angular displacement of the collar 76 relative to the drivable shaft 64, but allows the collar 76 to slide axially along the drivable shaft 64 to a first position where the concave recesses 78 lie in, or substantially in, the same transverse plane as the primary braking surface 60 of the fixed part 16, and to a second position where the concave recesses 78 lie in, or substantially in, the same transverse plane as the secondary annular contact surface 62.

An end-cap 80 is screw-threadably fastened to one end of the collar 76 to form a receptacle in which the end of the drivable part 14 can slide. The end-cap 80 includes a screw-threaded opening 82 coaxially aligned with the rotational axes of the driving and drivable parts 12 and 14.

The collar 76 is integrally formed with a circumferentially extending shoulder 84 which borders the sides of the concave recesses 78 closest to the end-cap 80. A separate retaining ring 86, held in place by a retaining clip 88 engaged with the collar 76, borders the other side of the concave recesses 78.

The stepped bore of the hollow driving shaft 32, adjacent the planet carrier 44, is dimensioned to enable the collar 76 to be slidably receivable, along the rotational axis 94 of the rotary coupling 10, in the hollow driving shaft 32 to the said first position and the said second position. At the first position, the end-cap 80 abuts, or substantially abuts, the end face of the drivable shaft 64; and in the second position, the collar shoulder 84 abuts, or substantially abuts, the end face of the driving shaft 32.

The driving and drivable parts 12 and 14 are coupled together by means of a set of independent coupling members 90. These are arranged in a planetary array around the collar 76, seated in the concave recesses 78 and limited in axial movement, relative to the collar 76, by the collar shoulder 84 on one side and the retaining ring 86 on the other. Each coupling member 90 projects radially from its concave recess 78 and is received in a respective one of the said elongate U-shaped seatings 54 of the planet carrier 44.

Each coupling member 90 is in the form of a truncated cylinder (see FIG. 3) with a cylinder axis 92 parallel to the rotational axis 94 of the rotary coupling 10. The truncation of the cylinder defines a wedging surface 96 which faces radially outwards. Each wedging surface 96 is of arcuate cross-section, with a slightly smaller radius than the primary braking surface 60 of the fixed part 16 and the secondary annular contact surface 62 of the driving part 12.

It should be noted that the cylinder axis 92 of each coupling member 90 lies on a pitch circle which is intermediate the inner and outer perimeters of the planet carrier 44.

Each coupling member 90 includes an opening 98 formed at its base symmetrically in the face facing the collar shoulder 84. In this case, the opening 98 is a recess, but it may equally be a through-hole. A pin element 100 projects, in parallel or substantially in parallel with the rotational axis 94 of the coupling 10, from the collar shoulder 84 and engages the coupling member 90 through the opening 98.

The pin element 100 is a close fit in the coupling member opening 98, but is spaced from the surface of the concave recess 78.

A lever mechanism comprises a manual lever 102, pivotably mounted to an exterior surface of the reduction gearbox 36, and an elongate push-rod actuating element 104 coupled to the lever 102. The push-rod element 104 extends, via a fluid-tight gasket 106, through the reduction gearbox 36 and coaxially along the bore 108 of the hollow driving shaft 32. The end of the push-rod element 104, received in the rotary coupling 10, is screw-threadingly engaged with the screw-threaded opening 82 of the end-cap 80 fastened to the collar 76.

The input side of the reduction gearbox 36 is directly coupled to a suitable battery-operated motor 110, and the gearbox 36 has a pinion gear 112 and crown gear 114 arrangement. The pinion gear 112 is directly driven by the motor 110, and the crown gear 114 is coaxially and concentrically mounted on the projecting end of the driving shaft 32 of the rotary coupling 10.

A positive engagement clutch is used to torque transmittingly engage and disengage the reduction gearbox 36, being the torque input side of the positive clutch, and the rotary coupling 10, being the torque output side.

The positive clutch has a torque input member, being the crown wheel 114 of the reduction gearbox 36, and a torque output member, being the driving shaft 32 of the rotary coupling 10. The positive clutch also includes first engagement members which are in the form of first ball-bearings 116 and which are seated in equi-angularly spaced apertures 118 around the driving shaft 32, adjacent to its projecting end, and second engagement members which are in the form of second ball-bearings 120 and which are seated in equi-angularly spaced apertures 114a formed in the crown gear 114. The first ball-bearings 116 are free to independently move radially relative to the driving shaft 32, but are restricted from moving circumferentially by the apertures 118.

Figure 4:
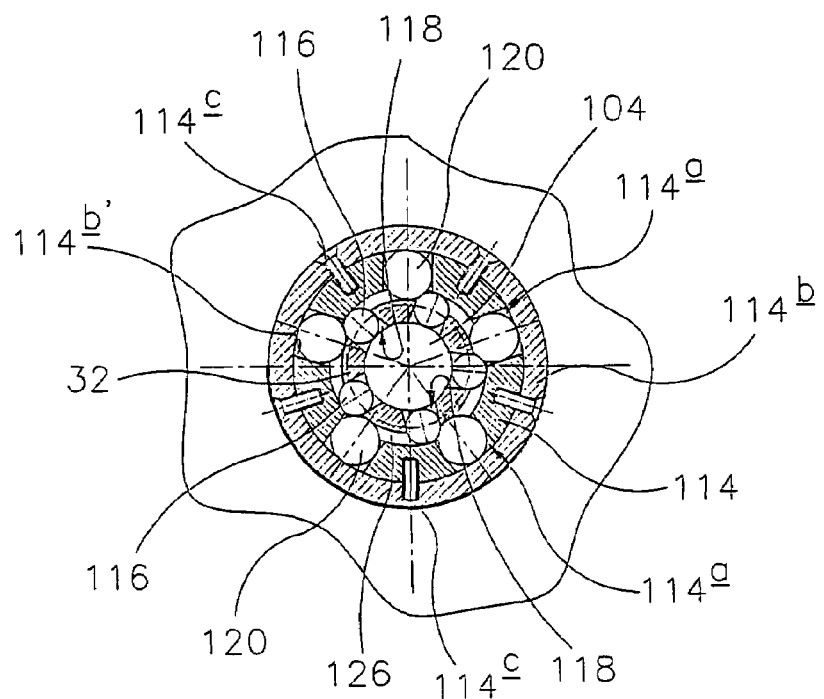
FIG. 4 is a transverse sectional view taken along the line B—B in FIG. 1.
Figure 5:
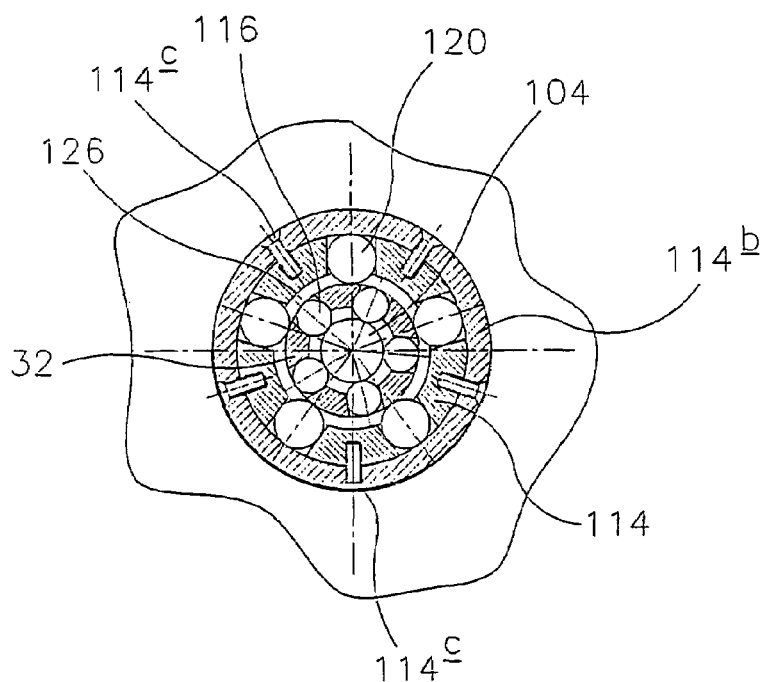
FIG. 5 is a transverse sectional view taken along the line B—B in FIG. 2.
Figure 6:
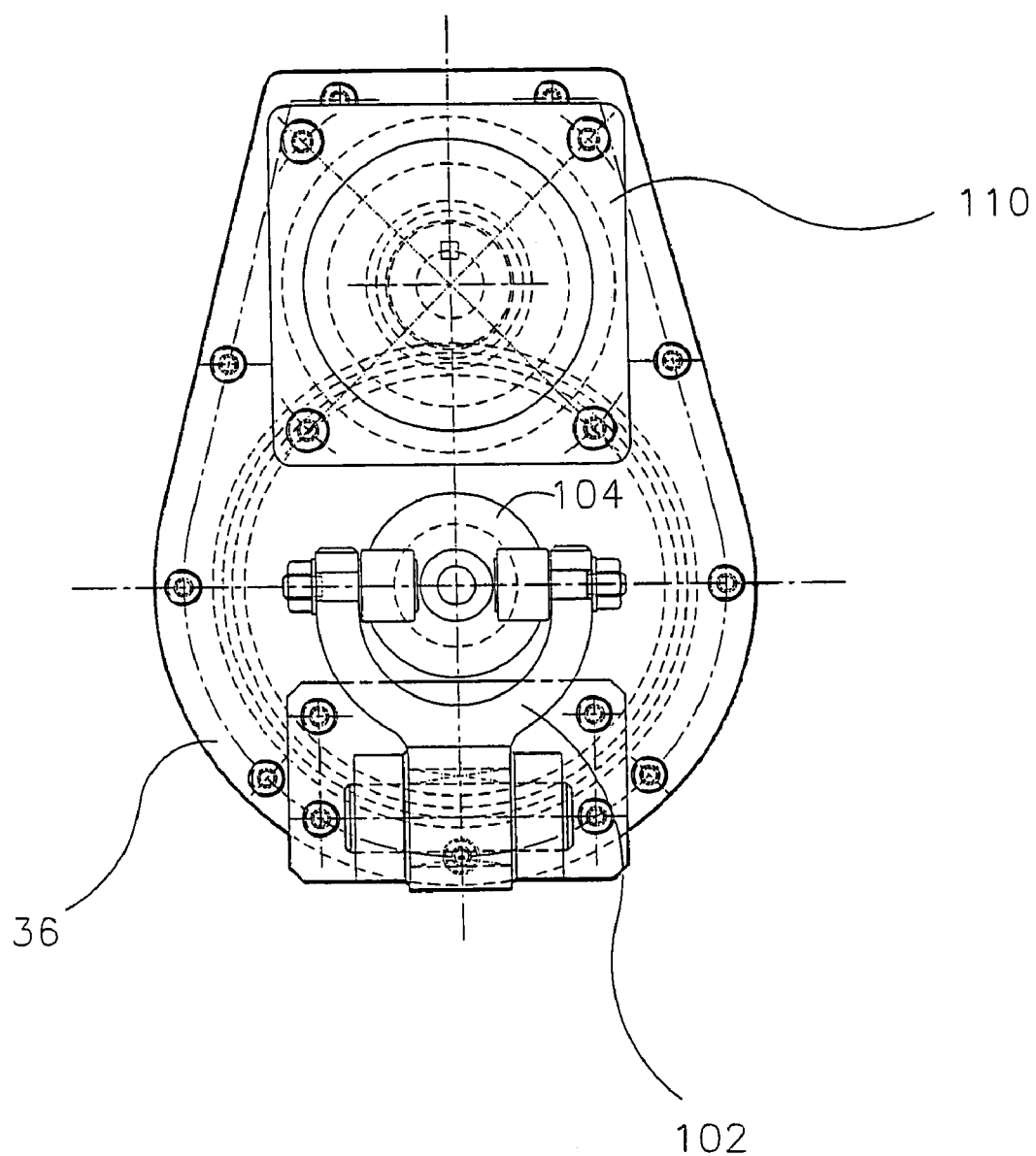
FIG. 6 is an elevational view of the right-hand end of the rotary coupling shown in FIG. 1.

The crown gear 114 includes a retaining ring 114b fixed relative to the apertures 114a via screw-threaded elements 114c. See FIGS. 4 and 5. The retaining ring 114b covers the apertures 114a, so that the second ball-bearings 120 can bear against the internal surface 114b' of the retaining ring 114b. The second ball-bearings 120 are independent of each other and project radially inwards into a gap 126 (see FIGS. 4 and 5) between the crown wheel 114 and the driving shaft 32. The second ball-bearings 120 are prevented from moving radially outwards by the retaining ring 114b and circumferentially by the apertures 114a.

The push-rod element 104 of the lever mechanism includes a frusto-conical portion 122 along which the first ball-bearings 116 ride. With the push-rod element 104 in an axially extended condition, each first ball-bearing 116 projects radially inwards from the driving shaft 32 and does not-project radially beyond the outer edge of its aperture 118. As a consequence, when the crown gear 114 rotates, there is no wedging engagement between the first and second ball-bearings 116 and 120. However, with the push-rod element 104 in an axially inserted condition, the first ball-bearings 116 are positioned up the inclined surface of the frusto-conical portion 122 and are thus urged radially outwards towards the crown gear 114 into positive, and therefore torque transmitting, engagement with the radially inwardly projecting second ball-bearings 120.

Referring to FIG. 1, in normal operation, when it is required to prevent a runaway condition occurring, the lever 102 of the lever mechanism is operated to move the push-rod element 104 axially inwards to its inserted condition. This movement causes the collar 76 to take up the first position so that the wedging surfaces 96 of the coupling members 90 are juxtaposed to the primary braking surface 60 of the fixed part 16.

The inwards axial movement of the push-rod element 104 has the additional effect of torque engaging the driving shaft 32 with the crown gear 114 of the reduction gearbox 36 through the positive engagement clutch. As the crown gear 114 rotates, the radially inwardly projecting second ball-bearings 120 move into contact with and thus engage the radially outwardly projecting first ball-bearings 116. This engagement causes each first ball-bearing 116 to be progressively urged against the push-rod element 104 and a side or sides of its aperture 118 by the abutting second ball-bearing 120, and each second ball-bearing 120 to be progressively urged against the braking ring 114b and a side or sides of its aperture 114a by the abutting first ball-bearing 116. Positive torque-transmitting engagement is thus achieved between the crown gear 114 and the driving shaft 32.

The progressive engagement between the first and second ball-bearings 116 and 120 is caused, at least in part, by the slight rolling of the first and second ball-bearings 116 and 120 as they contact and are urged against each other prior to their full wedging engagement as the crown wheel 114 engages with the driving shaft 32.

When the motor 110 is now operated, the driving shaft 32 is driven through the reduction gearbox 36 and the positive clutch, and torque is transmitted to the drivable shaft 64 through the appropriate thrust surfaces 56 (depending on the direction of rotation) of the U-shaped seatings 54 of the planet carrier 44 and the coupling members 90. The engagement between the thrust surfaces 56 and the coupling members 90 result in a generally tangential thrust in a radial zone (generally defined by the thrust surface 56), and this thrust is close to, and/or passes through, the cylinder axis 92 of each coupling member 90. As best seen in FIG. 3, the thrust surfaces 56 may be shaped to lie at an angle to the coupling members 90. This enables point contact between the thrust surfaces 56 and the respective coupling members 90. This point contact allows orientation of the thrust imparted by the thrust surfaces 56 to the coupling members 90 to be controlled and thus improve the performance of the rotary coupling 10.

The application of the said thrust causes the coupling members 90 to project radially inwards from the planet carrier 44 to engage, in another radial zone, the concave recesses 78 of the collar 76, thereby transmitting the torque to the drivable part 14 and rotating the wheel 68.

Referring to FIG. 3, the part-sinusoidal shape of each concave recess 78 is such that the base portion 130 of the recess 78 has a radius which matches, or substantially matches, the radius of the bottom surface 132 of the respective coupling member 90. The portions 134 of the surface of the recess 78 adjacent the base portion 132 present cam forms which, in this case, act to improve engagement of the coupling member 90 with the recess 78.

In a normal stationary configuration, i.e. when the reduction gearbox 36 is engaged via the positive clutch but the motor 110 is not driving, each coupling member 90 lies in a generally radially symmetrical attitude in its U-shaped seating 54, and the wedging surfaces 96 of the coupling members 90 are out of contact with the braking surface 60 of the fixed part 16.

The pin element 100, acting in conjunction with the corresponding opening 98, helps the coupling member 90 retain its generally radially symmetrical attitude during normal operation of the rotary coupling 10.

If a net reverse torque is applied (for example, in a runaway condition) externally to the drivable part 14 of the rotary coupling 10 through the wheel 68, this reverse torque is transmitted to the coupling members 90 through the concave recesses 78 of the collar 76. The radial engagement zone of the coupling members 90 with the drivable part 14 is substantially further from the cylinder axis 92 than the radial zone in which the forward thrust is applied by the thrust surface 56 in the normal driving mode. A turning moment is therefore applied to the coupling members 90 by the concave recesses 78. As the coupling members 90 move in a circumferential direction along the base portion 130 and the cam-form surface portions 134, this induces movement about the cylinder axes 92, which are therefore moment axes, and the coupling members 90 ride up one or other thrust surface 56 (depending on the direction of rotation of the coupling) towards the braking surface 60 of the fixed part 16.

The pin element 100 in conjunction with the opening 98 aid in providing a positive and progressive movement and rotation of the coupling member 90 along the base portion 130 and the cam-form surface portions 134. As each coupling member 90 continues to rotate and ride up one cam-form surface portion 134 of its recess 78, the wedging surface 96 progressively contacts, and is thus forced into progressive wedging engagement, with the braking surface 60. The rotary coupling 10 is therefore progressively locked up, preventing the reverse torque from passing to the driving part 12 and preventing the wheel 68 from turning.

Figure 2:
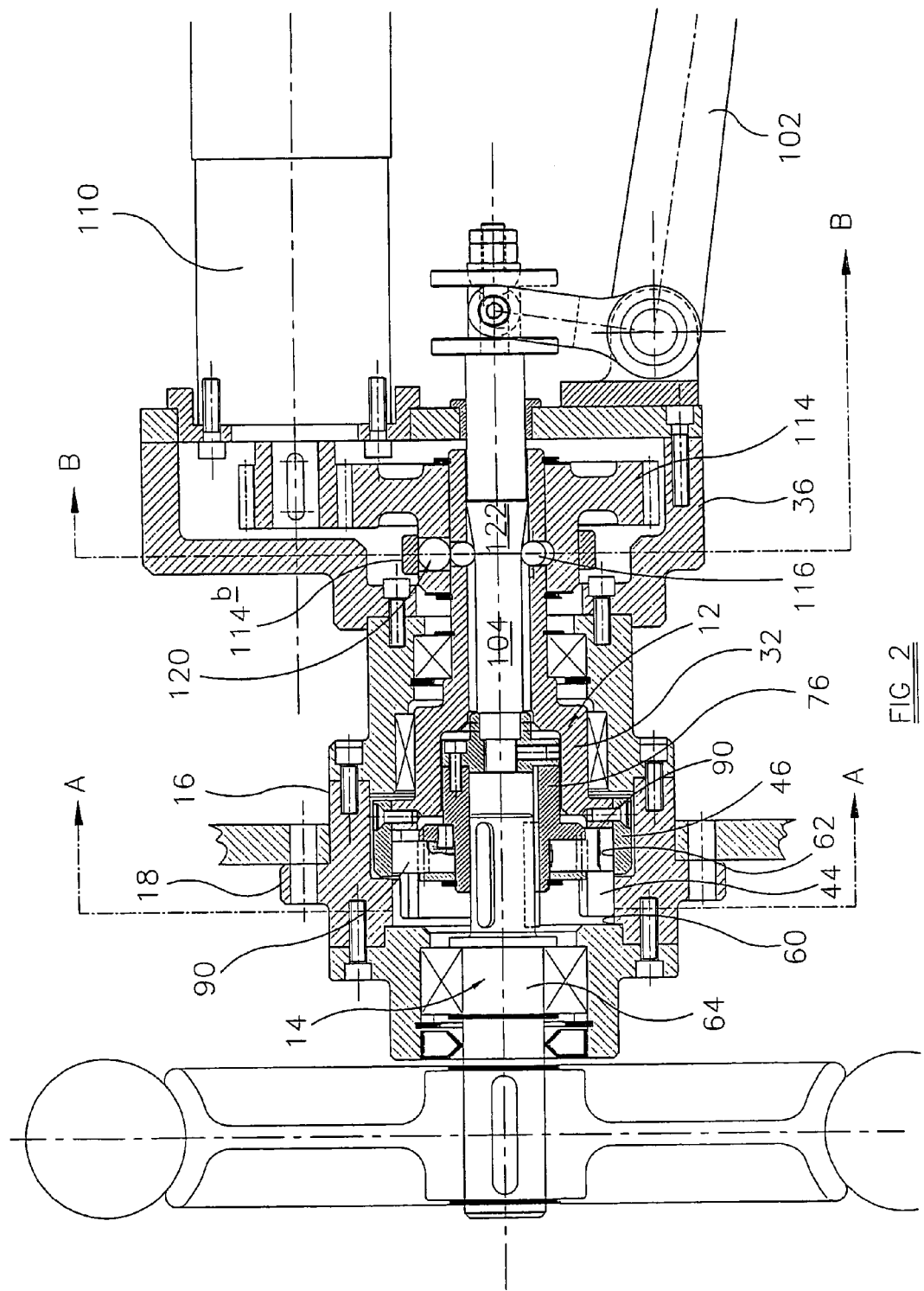
FIG. 2 is a view similar to FIG. 1, but showing the rotary coupling and the positive engagement clutch both in a second condition.

Referring to FIG. 2, when the wheel 68 is required to be in a free-wheel 68 state, i.e. when the application of a reverse torque does not cause the rotary coupling 10 to lock up, the lever 102 is operated to move the push-rod element 104 axially to its extended condition. This causes the collar 76 to slide to the second position. This sliding movement results in the coupling members 90 sliding in their respective elongate U-shaped seatings 54 so that the wedging surfaces 96 are now juxtaposed to the secondary annular contact surface 62 of the driving part 12.

The outwards axial movement of the push-rod element 104 has the additional effect of torque disengaging the driving shaft 32 and the crown gear 114 of the reduction gearbox 36, due to the movement of the first ball-bearings 116 down the incline of the frusto-conical portion of the push-rod element 104 and out of engagement with the second ball-bearings 120.

The wheel 68 can now freely rotate in either direction, regardless of whether the crown gear 114 is being driven. Back-driving of the drivable shaft 64, i.e. applying a net reverse toque, as described above, causes a turning moment to be imparted to the coupling members 90, whereby the coupling members 90 ride up the base and cam-form surface portions 130 and 134 of the concave recesses 78 and the appropriate thrust surfaces 56 of the U-shaped seatings 54 of the planet carrier 44 into progressive wedging engagement with the secondary annular contact surface 62 of the driving part 12. However, since the driving shaft 32 is torque disengaged from the reduction gearbox 36, any wedging engagement of the coupling members 90 with the secondary annular contact surface 62 simply causes the driving shaft 32 to rotate freely in the bearings 38.

Although a lever mechanism is used for selectively changing the rotary coupling 10 from the first condition in which the transmission of a reverse torque is prevented, to the second condition in which the transmission of a reverse torque is permitted, any suitable actuator mechanism could be utilised.

The rotary coupling having the positive engagement clutch arrangement is not limited to being applied to a wheelchair, and it could easily be adapted for use in numerous other applications. For example, it is particularly suitable for use in a stairlift or gravity-assisted door, such as a fire-door. The inclusion of the reduction gearbox, instead of a worm-drive gearbox, significantly improves efficiency and decreases battery power consumption by the motor.

The positive engagement clutch is not limited to being used in combination with the rotary coupling, and could easily be adapted for use in many other applications.

The first and second engagement members of the positive engagement clutch could be in the form of rollers and/or cylinders, instead of ball-bearings.

The first engagement members could also be carried by the crown wheel, and the second engagement members could be carried by the driving shaft. In this case, the actuator would be arranged around the perimeter of the crown wheel.

It is thus possible to provide a rotary coupling that, in a first condition, can prevent the transmission of a net reverse torque from the drivable side to the driving side and, in a second condition, allows free rotation in any direction on the application of a net torque to the drivable side. It is also possible to provide a rotary coupling that permits the use of a reduction gearbox, instead of a worm-drive gearbox, while still preventing the possibility of back-drive.

It is also possible to provide a simple and progressive positive engagement clutch through which the application of torque transmission can be controlled, and through which a large magnitude of torque can be transmitted without inducing failure. It is also possible to provide a positive engagement clutch which provides feedback to an operator.

It is further possible to provide a rotary coupling having a positive engagement clutch, thereby dispensing with the need for a friction clutch.

The embodiment described above is given by way of example only, and modifications will be apparent to persons skilled in the art without departing from the scope of the invention as defined by the appended claims. For example, it may be possible to carry the coupling members on the drivable part instead of on the driving part; and the coupling members could be moved between the first condition and the second condition in a manner other than by displacement in the direction of the rotational axis of the rotary coupling.

What is claimed is:

1. A combination of a positive engagement clutch having a torque input side and a torque output side with a rotary coupling;

the clutch comprising:
    a torque input member arranged on the torque input side,
    a torque output member arranged on the torque output side,
    first engagement members,
    second engagement members, and
    an actuator,
the torque input member and the torque output member being arranged concentrically to rotate on a common axis,
one of the torque input member and the torque output member carrying the first engagement members,
the other of the torque input member and the torque output member carrying the second engagement members, the first engagement members being radially movable by the actuator between a projecting and a retracted position, the second engagement members projecting radially into a gap between the torque input member and the torque output member, the first and second engagement members engaging with each other, when the first engagement members are in the projecting position, to progressively engage the torque input and output members to allow the transmission of torque to the torque output side, the first and second engagement members being disengaged from each other, when the first engagement members are in the retracted position, to prevent the transmission of torque to the torque output side;

the rotary coupling comprising:

a driving part, a drivable part, a fixed part in which the driving and drivable parts are each rotatable coaxially, and a set of coupling members carried by one of the driving and drivable parts for torque-transmitting engagement with the other, the coupling members being selectively positionable so that, in a first condition, the coupling members are juxtaposed to a primary annular contact surface of either the fixed part or the drivable part and, in a second condition, the coupling members are juxtaposed to a secondary annular contact surface of the driving part, each coupling member being free to move relative to the driving and drivable parts into and out of engagement with the primary and secondary annular contact surfaces, and the arrangement being such that, when the coupling members are in the first condition, the application of a first torque on the coupling members causes the coupling members to engage the primary annular contact surface and, when the coupling members are in the second condition, the application of a second torque on the coupling members causes the coupling members to engage the secondary annular contact surface.

2. The combination as claimed in claim 1, wherein the first and second engagement members are in the form of ball-bearings.

3. The combination as claimed in claim 1, wherein the second engagement members project radially inwards into the gap, which is positioned between the torque input member and the torque output member.

4. The combination as claimed in claim 1, wherein the actuator is in the form of a push-rod element having a frusto-conical portion along which the first engagement members can move to take up the projecting position or the retracted position.

5. The combination as claimed in claim 1, wherein the first engagement members are free to move independently of each other.

6. The combination as claimed in claim 1, wherein the second engagement members are free to move independently of each other.

7. The combination as claimed in claim 1, wherein the first engagement members are carried by the torque output member, and the second engagement members are carried by the torque input member.

* * * * *